July 6, 1926. 1,591,675
F. A. FULLERTON
BROOM CORN HARVESTER
Filed Jan. 31, 1924 5 Sheets-Sheet 3

July 6, 1926.  1,591,675
F. A. FULLERTON
BROOM CORN HARVESTER
Filed Jan. 31, 1924   5 Sheets-Sheet 4
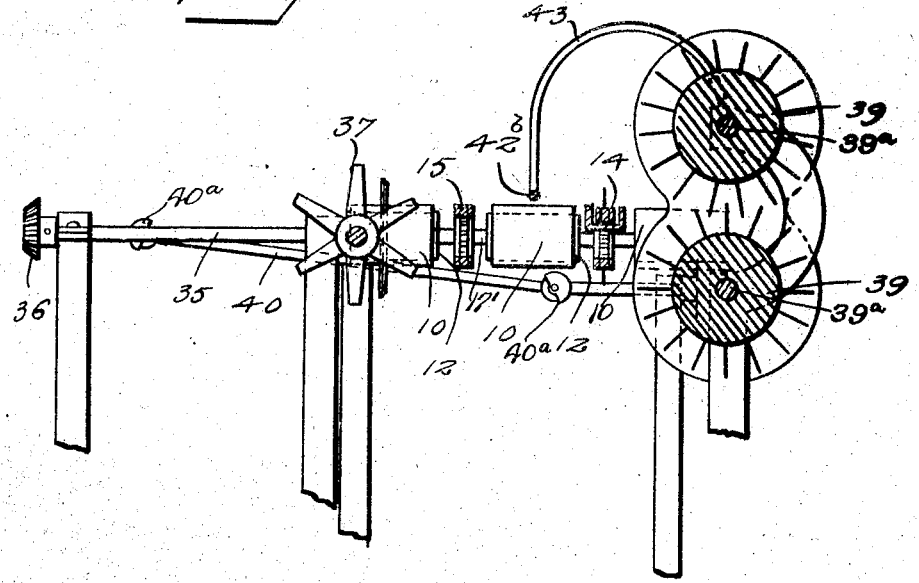
Fig. 4.
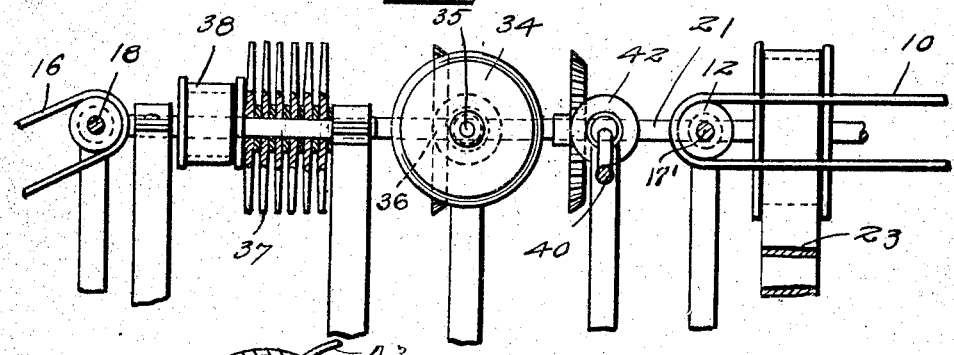
Fig. 5.
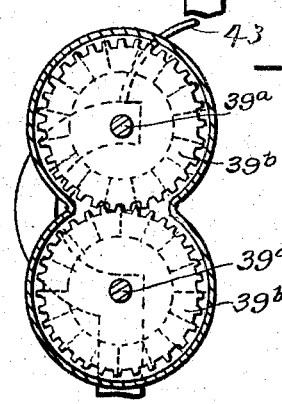
Fig. 6.
Inventor
F. A. Fullerton
By
Attorney

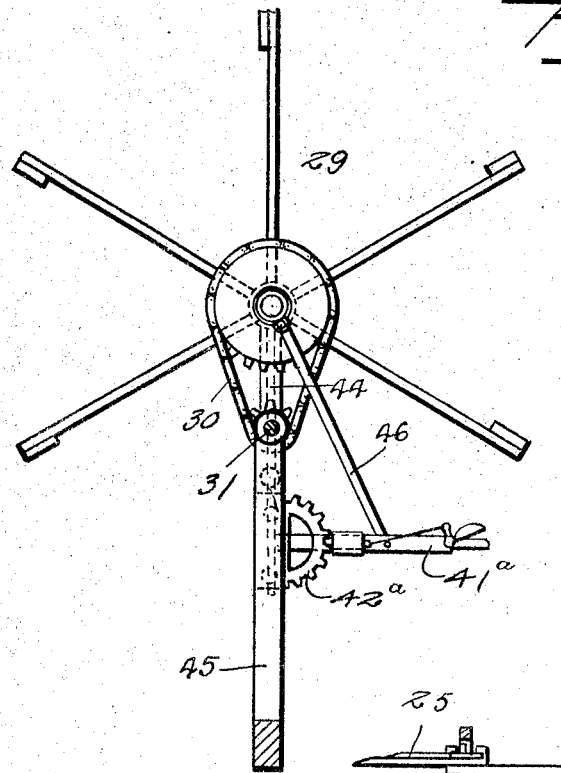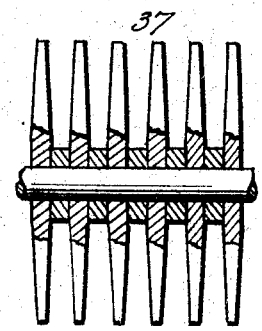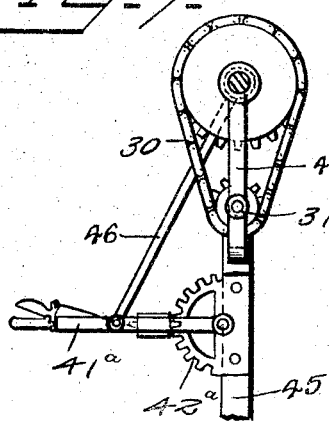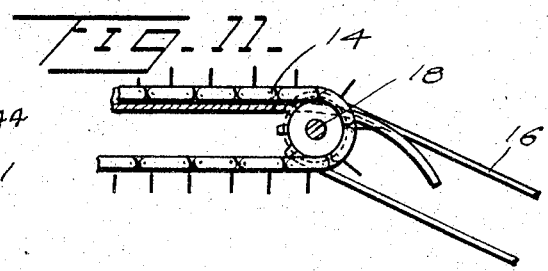

Patented July 6, 1926.

1,591,675

UNITED STATES PATENT OFFICE.

FRANK A. FULLERTON, OF TUSCOLA, ILLINOIS.

BROOM-CORN HARVESTER.

Application filed January 31, 1924. Serial No. 689,752.

The invention has relation to agricultural implements and more particularly to those designed for harvesting and specifically aims to provide a machine for harvesting broom corn and depositing the same in a wagon or other receiver associated with the harvester, the machine cutting the tops from the stalks and removing the boots and seeds therefrom and depositing the product in a receiver by means of which the harvest is conveyed to a shed or other place of storage.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Figure 1:
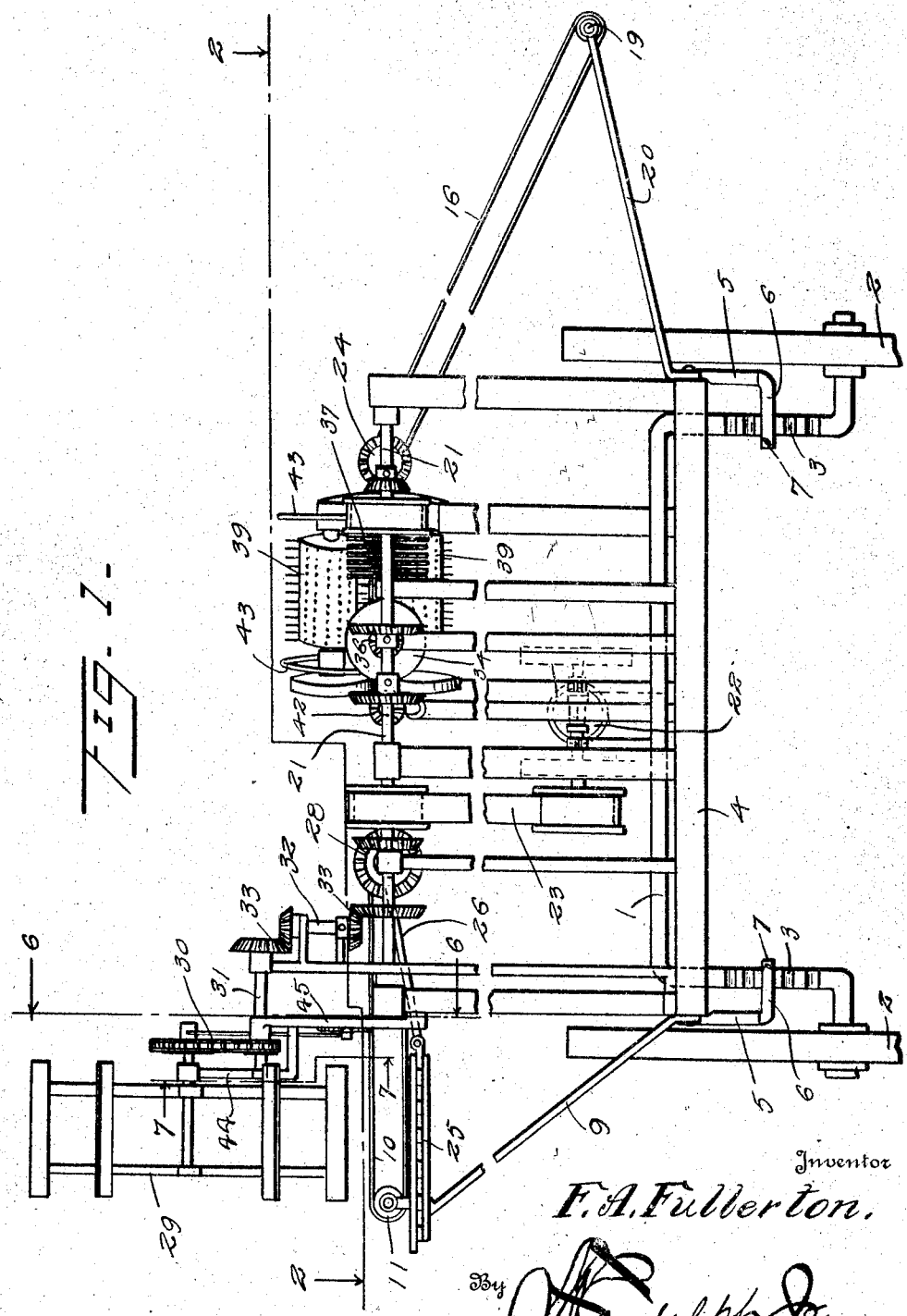
Figure 2:
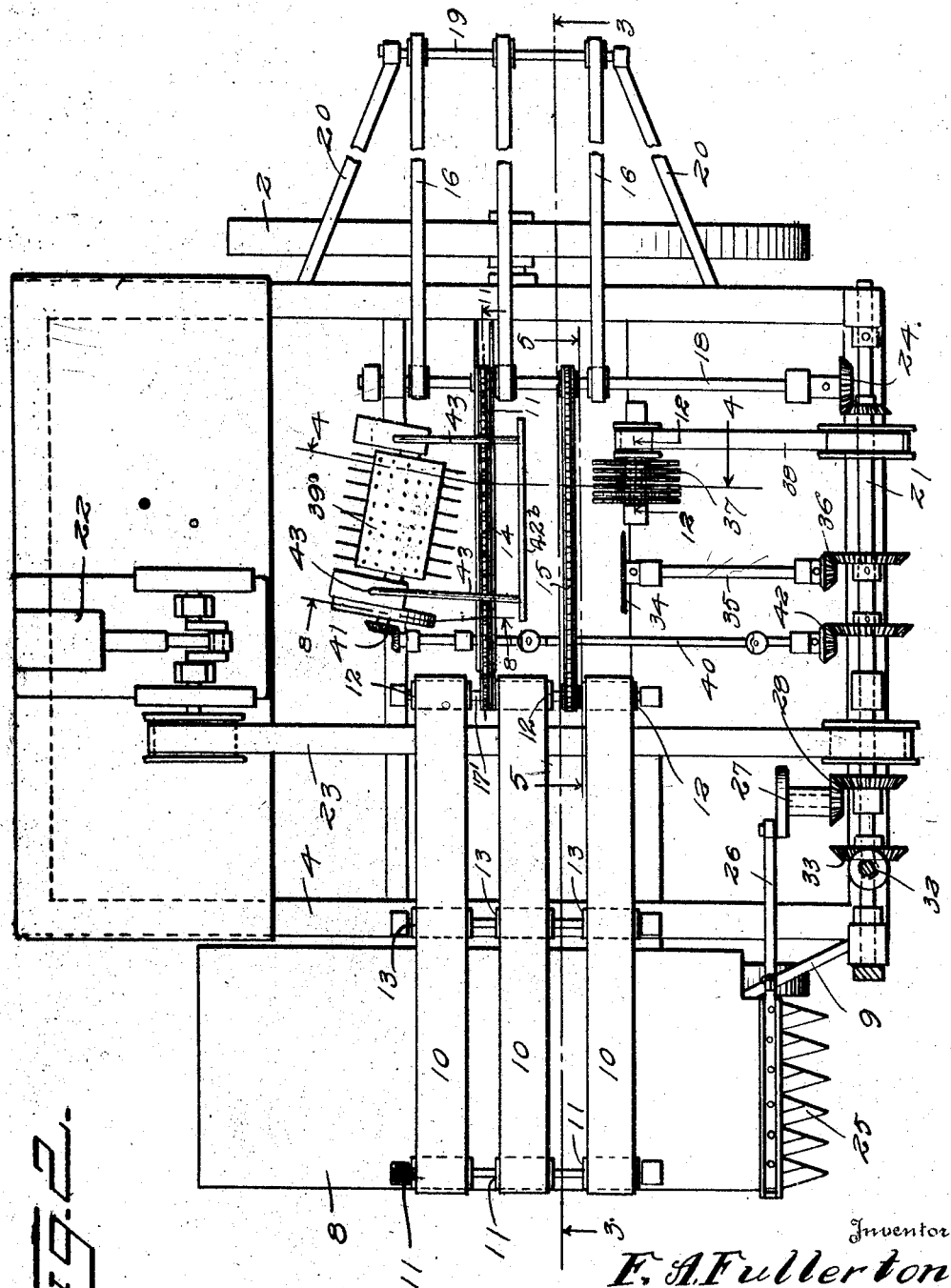
Figure 3:
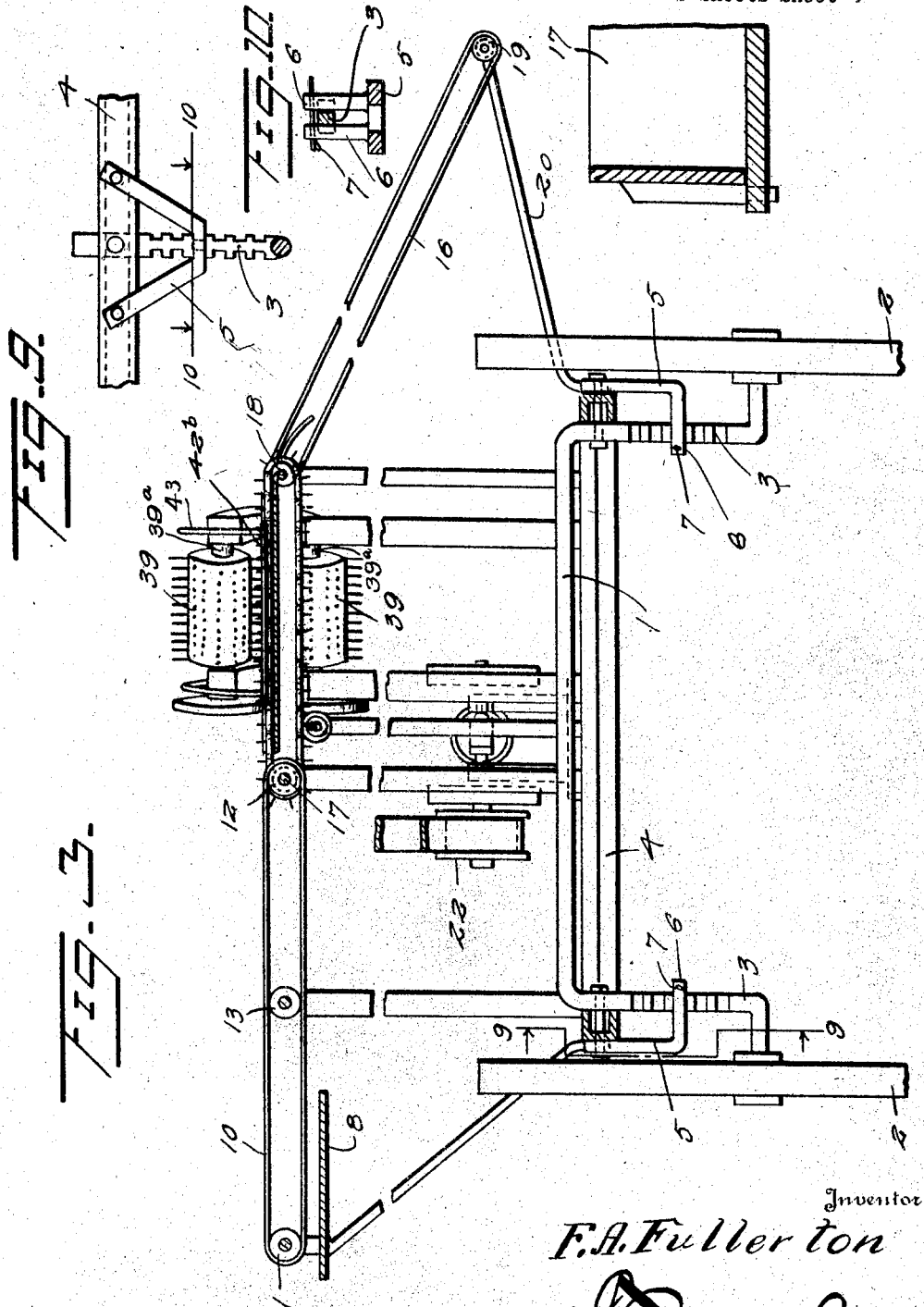

Referring to the accompanying drawings forming a part of the application:

Figure 1 is a front view of a broom corn harvesting machine embodying the invention, parts being broken away, Figure 2 is a top plan view of the machine, Figure 3 is a vertical transverse sectional view of the machine on the line 3—3 of Figure 2, looking to the rear as designated by the arrows, Figure 4 is an enlarged detail sectional view on the line 4—4 of Figure 2, Figure 5 is an enlarged detail sectional view on the line 5—5 of Figure 2, looking in the direction of the arrows, Figure 6 is a detail sectional view on the line 6—6 of Figure 1, showing the parts on a larger scale and looking in the direction designated by the arrows, Figure 7 is a similar sectional view on the line 7—7 of Figure 1, looking to the right as indicated by the arrows, Figure 8 is a detail sectional view on the line 8—8 of Figure 2, the parts being enlarged, Figure 9 is a detail sectional view on the line 9—9 of Figure 3, Figure 10 is a horizontal section on the line 10—10 of Figure 9, Figure 11 is an enlarged sectional detail view on the line 11—11 of Figure 2, and Figure 12 is an enlarged detail sectional view on the line 12—12 of Figure 2.

Corresponding and like parts are referred to in the following description and designated in the several views of the drawings by like reference characters.

The machine is mounted upon an arched axle 1 in a manner to admit of vertical adjustment to adapt the same to the stand or height of the broom corn to be harvested. Ground wheels 2 are mounted upon the spindles or arms of the arched axle 1. The vertical arms 3 at the ends of the arched axle are notched in opposite sides, as shown most clearly in Figure 9, and provide positive means for moving the frame 4 at the required adjusted elevation. Brackets 5 secured to opposite sides of the frame 4 are provided with inwardly disposed spaced elements 6 which embrace opposite sides of the respective arms 3 and engage the notches thereof to positively hold the frame in the required adjusted position. A pin 7 passed through registering openings formed in the outer ends of the elements 6 prevents casual disengagement of the arms 3 therefrom. The arched axle 1 is bolted or otherwise secured to the frame 4 and the brackets 5 are likewise secured to the frame and serve to brace the arched axle, as indicated most clearly in Figure 9.

A platform 8 is located at one side of the machine and is supported by braces 9 and suitable uprights. An endless conveyor operates over the platform 8 and comprises a plurality of belts 10 disposed transversely of the machine and mounted upon outer rollers 11 and inner rollers 12 and prevented from sagging by intermediate rollers 13. The inner ends of the endless belts 10 extend over the side of the machine adjacent the platform 8. Two endless chains 14 and 15 disposed in spaced and parallel relation are arranged in the plane of the endless belt 10 and receive the tops of the broom corn from the endless conveyor and deliver said tops to endless belts 16 which incline outwardly and downwardly and deliver the broom corn to a suitable receiver 17 which may consist of a wagon drawn over the field together with the harvester and located at one side thereof so as to receive the product. The endless belts 16 constitute a conveyor which is located at the side of the machine opposite that provided with the receiving endless conveyor comprising the belt 10. The endless chain 14 is toothed to make positive engagement with the tops of the broom corn to positively move the same across the cutting, moving and threshing devices. The endless chain 15 is devoid of teeth and advances the butt ends of the broom corn resting thereon. The adjacent ends of the endless elements 10, 14 and 15 are supported by a shaft 17' which is common thereto and which shaft is positively driven from a shaft 18 by the endless chains 14 and 15. The endless belts 16 comprising the delivery conveyor are likewise driven from the shaft 18. A shaft 19 supported by braces 20 forms supporting means for the outer lower ends of the belts 16.

A transversely disposed counter-shaft 21 is located at the front of the machine and is driven from a suitable motor 22 by means of a drive belt 23. Bevel gearing 24 connects the shafts 18 and 21.

A cutting mechanism 25 is located at the front of the platform 8 and movement is transmitted thereto by means of a pitman 26 from a shaft 27 which is connected to the counter-shaft 21 by means of bevel gearing 28. A reel 29 is located above the front end of the platform 8 and operates to throw the tops of the broom corn as cut onto the endless conveyor 10 which moves the same transversely to the endless chains 14 and 15. A sprocket chain 30 connects the shaft of the reel 29 with a shaft 31 which in turn is geared to a vertical shaft 32 by means of bevel gearing 33, said shaft 32 in turn being geared to the shaft 21 by means of bevel gearing 33.

A rotary cutter 34, attached to the rear end of a shaft 35 which is driven from the shaft 21 by means of bevel gearing 36, operates in a measure to even the stems of the broom corn as they pass transversely across the machine to the receiver 17. A rotary gang cutter 37 is disposed about in line with the rotary cutter 34 and operates to remove the boots from the stems of the broom corn. A drive belt 38 connects the shaft of the booter 37 with the counter-shaft 21.

A pair of threshing cylinders 39 is disposed rearwardly of the endless chains 14 and 15 and intermediate the conveyors 10 and 16 and operates to remove the seed from the tops of the broom corn as the latter passes transversely across the machine. These threshing cylinders or rolls 39 are secured to shaft $39^a$ and arranged at an inclination to the endless chains 14 and 15. Shafts $39^a$ are geared at one end for positive rotation by means of pinion $39^b$, as shown most clearly in Figure 8, and the shaft $39^a$ of one of the cylinders or rolls is geared to a shaft 40, as indicated at 41, and said shaft in turn is geared to the counter-shaft 21 as indicated at 42, the gearing in this instance being preferably of the bevel type. The shaft 40 is provided in its length with universal joints $40^a$ so as to allow for the difference in the position of the parts.

The reel 29 is mounted for adjustment forwardly and rearwardly by means of a supporting arm 44 pivotally carried on shaft 31, 45 indicating a bracket supported on the frame of the machine and providing a bearing for said shaft 31. Supporting arm 44 is moved by means of a lever $41^a$ by means of a rod 46 pivotally connected to said arm and to the lever and is held in the required adjusted position by means of a segment $42^a$ and hand latch on the lever $41^a$. A presser bar $42^b$ is disposed above the endless chains 14 and 15 and operates to hold the broom corn in contact therewith. Spring arms 43 support the presser bar $42^b$ and are connected to a convenient part of the machine, such as the uprights forming supporting means for the threshing cylinders or rolls 39.

What is claimed is:

1. In a broom corn harvester, a harvester cutting mechanism, a counter shaft, means to drive the counter shaft, spaced shafts extending at an angle to and driven from the counter shaft, a threshing mechanism driven by one of said spaced shafts, conveyor chains for harvested broom corn trained over and driven by said spaced shafts, spaced feeding belts arranged alternately with said chains, a driving shaft for said belts over which said chains pass, and discharge belts arranged alternately with respect to the chains and driven by one of the spaced shafts, a stem-evening cutter, a gang cutter, means driving said cutters from the counter shaft, and said cutters being arranged on the opposite side of the chains to the threshing mechanism and substantially in line with one of the first mentioned belts.

2. In a broom corn harvester, an elevated platform at one side of the machine, a cutting mechanism at the front of said platform, an endless conveyor operating over the platform and the adjacent portion of the main frame and comprising a plurality of conveyor elements, a delivery conveyor at the opposite side of the machine for discharging the harvest into the receiver and comprising a plurality of spaced conveyor elements, endless chains intermediate the receiving and delivering conveyors and arranged laterally alternately with respect thereto, a threshing mechanism upon one side of the endless chains, and a cutting and booting mechanism upon the opposite side of the endless chains.

3. In a broom corn harvester, an elevated platform at one side of the machine, a cutting mechanism at the front of the platform, a reel disposed above the forward portion of the platform, means for adjusting the reel forwardly and rearwardly, an endless conveyor operating over the platform and an adjacent portion of the main frame comprising a plurality of spaced belts, a delivery conveyor at the opposite side of the machine and inclining laterally and downwardly and comprising a plurality of spaced belts, endless chains intermediate the receiving and delivering conveyors and arranged laterally alternately with respect to said belts, a yieldably supported presser bar disposed opposite the endless chains, a threshing mechanim at one side of the endless chains and intermediate the receiving and delivery conveyors, and a cutting and booting mechanism disposed upon the opposite side of the endless chains.

In testimony whereof I affix my signature.

FRANK A. FULLERTON.